(12) United States Patent
Cruickshank

(10) Patent No.: US 11,739,861 B2
(45) Date of Patent: Aug. 29, 2023

(54) PIPE SUPPORT SYSTEM WITH MULTIPLE CLAMPS

(71) Applicant: J. RAY MCDERMOTT, S.A., Houston, TX (US)

(72) Inventor: John Duncan Cruickshank, Banchory (GB)

(73) Assignee: J. RAY MCDERMOTT, S.A., Houston, TX (US)

( * ) Notice: Subject to any disclaimer, the term of this patent is extended or adjusted under 35 U.S.C. 154(b) by 109 days.

(21) Appl. No.: 17/275,238

(22) PCT Filed: Sep. 27, 2019

(86) PCT No.: PCT/US2019/053489
§ 371 (c)(1),
(2) Date: Mar. 11, 2021

(87) PCT Pub. No.: WO2020/069337
PCT Pub. Date: Apr. 2, 2020

(65) Prior Publication Data
US 2022/0034427 A1 Feb. 3, 2022

Related U.S. Application Data

(60) Provisional application No. 62/738,639, filed on Sep. 28, 2018.

(51) Int. Cl.
*F16L 1/20* (2006.01)
(52) U.S. Cl.
CPC .................................. *F16L 1/207* (2013.01)

(58) Field of Classification Search
CPC ... F16L 1/20; F16L 1/202; F16L 1/207; F16L 1/235; F16L 1/19; F16L 1/225; B63B 35/03; B23K 37/0533
See application file for complete search history.

(56) References Cited

U.S. PATENT DOCUMENTS

| 6,334,739 | B1 * | 1/2002 | Baugh | F16L 1/235 |
|---|---|---|---|---|
| | | | | 405/177 |
| 8,807,872 | B2 * | 8/2014 | Willis | F16L 1/19 |
| | | | | 405/168.1 |

(Continued)

FOREIGN PATENT DOCUMENTS

| CN | 101156013 A | 4/2008 |
|---|---|---|
| CN | 105705852 A | 6/2016 |

(Continued)

OTHER PUBLICATIONS

Chinese Office Action issued to Application No. 201980063359.4 dated Mar. 3, 2022.

(Continued)

*Primary Examiner* — Benjamin F Fiorello
(74) *Attorney, Agent, or Firm* — Patterson + Sheridan, LLP

(57) ABSTRACT

The present invention relates to an apparatus for and a method of holding high top tension pipeline (101) during pipe-lay from a rolling and pitching vessel (730). In one implementation, a clamp system (711, 712) for supporting a pipe on a vessel includes a first clamp for coupling to the pipe and a second clamp for coupling to the pipe. The second clamp is disposed above the first clamp. At least one of the first clamp or the second clamp is movable relative to the other of the first clamp or the second clamp.

14 Claims, 14 Drawing Sheets

(56) References Cited

U.S. PATENT DOCUMENTS

| | | | | |
|---|---|---|---|---|
| 2002/0021943 A1* | 2/2002 | Frijns | ...................... | F16L 39/00 |
| | | | | 405/166 |
| 2003/0091395 A1* | 5/2003 | Stockstill | ................ | F16L 1/235 |
| | | | | 405/166 |
| 2005/0019100 A1* | 1/2005 | Simpson | ................... | F16L 1/19 |
| | | | | 405/166 |
| 2007/0189857 A1* | 8/2007 | Vergouw | ................... | F16L 1/19 |
| | | | | 405/166 |
| 2008/0304916 A1 | 12/2008 | Crotwell et al. | | |
| 2019/0376619 A1* | 12/2019 | Vehmeijer | ................. | F16L 1/23 |
| 2021/0246998 A1* | 8/2021 | Loussouarn | ............ | F16L 1/225 |

FOREIGN PATENT DOCUMENTS

| | | |
|---|---|---|
| EP | 3156707 A1 | 4/2017 |
| GB | 99007508 | 5/1999 |
| WO | 2001/035011 A1 | 5/2001 |
| WO | 2005/085692 A1 | 9/2005 |
| WO | 2018/044156 A1 | 3/2018 |

OTHER PUBLICATIONS

International Search Report and Written Opinion dated Jan. 3, 2020 for Application No. PCT/US2019/053489.

Chinese Office Action dated Sep. 23, 2022 for Application No. 201980063359.4.

\* cited by examiner

PIPE SUPPORT SYSTEM WITH MULTIPLE CLAMPS

BACKGROUND

Field

Aspects of the present disclosure generally relate to apparatus for and methods of holding high top tension pipeline during pipe-lay from a rolling and pitching vessel.

Description of the Related Art

There are many methods of laying deep water pipelines, such as reel-lay, J-Lay, and the like. When using these methods, at some point pipe is held in either a collar support or a pipe clamp, to install and weld additional lengths of pipe, or to install inline and second-end fittings.

Pipelines laid in deep water depths are subjected to high axial load due to the pipeline self-weight, and this in turn creates high axial stresses in the pipe wall. Sometimes, axial stresses alone reach 60-80% of material yield stress. Axial stresses which are acceptable for installation are set by design codes.

All vessels roll and pitch as a result of wave action. When laying a pipeline from a vessel, the pipeline is often held rigidly in a pipe clamp (approaching an "Encastre" support condition). The pipe at the base of the clamp will be subjected not only to the high axial stress, but also high bending stresses as a result of vessel roll and pitch motions. FIG. 1 illustrates a conventional single friction clamp 100 having a pipe 101 suspended therefrom. Arrows 102 and 103 illustrate show axial and bending stresses, respectively, in the pipe 101.

The total stress in the pipe is the summation of the axial and bending stresses, which is applied to the pipe 101 each time the vessel rolls or pitches, resulting in cyclical stressing. The magnitude of the bending stress is a product of the roll or pitch angle and the axial load applied. Cyclic bending stress can result in fatigue damage to the pipe 101 in the area directly below the clamp 100, which is the area of pipe 101 subjected to high combined axial/bending stresses.

FIG. 2A illustrates axial and bending stress distribution along one side of an axial length of a section of the pipe 101 below the conventional single friction clamp 100 of FIG. 1. FIG. 2B illustrates axial and bending stress distribution along another side of the axial length of the section of the pipe 101 below the conventional single friction clamp 101 of FIG. 1. FIGS. 2A and 2B illustrate stress distribution along opposite sides of a section of the pipe 101 below the conventional single friction clamp 100 of FIG. 1, in which FIG. 2A shows one side of the pipe being (at least partially) compressed from the bending stress and FIG. 2B shows the other side of the pipe being tensioned from the bending stress. Thus, FIG. 2A shows a resultant stress 203A from a positive axial stress 201A (tensioning the pipe) and a negative bending stress 202A (compressing the pipe), in which the resultant stress 203A on the pipe is shown as overall positive and tensioning the pipe. FIG. 2B shows a resultant stress 203B from a positive axial stress 201B (tensioning the pipe) and a positive bending stress 202B (also tensioning the pipe), in which the resultant stress 203B on the pipe is shown as overall positive and tensioning the pipe. The resultant stress 203B for the side of the pipe in FIG. 2B is generally larger than the resultant stress 203A for the side of the pipe in FIG. 2A. As a vessel pitches and rolls from side-to-side, each side of the pipe may cycle between the stress distribution shown in FIG. 2A to the stress distribution shown in FIG. 2B, and vice-versa. FIGS. 2A and 2B also do not show stress that may be applied to the axial length of the section of the pipe 101 from heave of a vessel (e.g., up-and-down movement of the vessel), which may vary the axial stress distributed to the pipe. FIGS. 2A and 2B focus on the roll and pitch of the vessel.

Conventionally, to reduce the fatigue damage to the pipe 101, the clamping time is shortened. The J-Lay technique, where the pipeline is laid by welding successive sections of pipe together, is particularly sensitive to the time that the pipe 101 can be held in the clamp 100 before exceeding fatigue limits. To provide sufficient time for welding operations, more stable (e.g., larger) vessels are often utilized, thus increasing day rates and project costs for pipe installation.

Therefore, what is needed is an improved apparatus for and method of holding high top tension pipeline during pipe-lay from a rolling and pitching vessel.

SUMMARY

Aspects of the present disclosure generally relate to apparatus for and methods of holding high top tension pipeline during pipe-lay from a rolling and pitching vessel.

In one implementation, a clamp system for supporting a pipe on a vessel includes a first clamp for coupling to the pipe and a second clamp for coupling to the pipe. The second clamp is disposed above the first clamp. At least one of the first clamp or the second clamp is movable relative to the other of the first clamp or the second clamp.

In one implementation, a method of supporting a pipe on a vessel includes coupling a first clamp to a pipe. The pipe includes a longitudinal axis. The method includes coupling a second clamp to the pipe. The method also includes moving at least one of the first clamp or the second clamp relative to the other of the first clamp or the second clamp while the first clamp and the second clamp are clamped to the pipe.

In one implementation, a clamp includes a plurality of clamping layers comprising one or more lower layers and one or more upper layers disposed above the one or more lower layers. Each of the one or more lower layers includes one or more variable squeeze cylinders, and one or more actuating clamp members. A pressure within each of the one or more variable squeeze cylinders is maintained at a constant value when the one or more actuating clamp members are in contact with a pipe.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
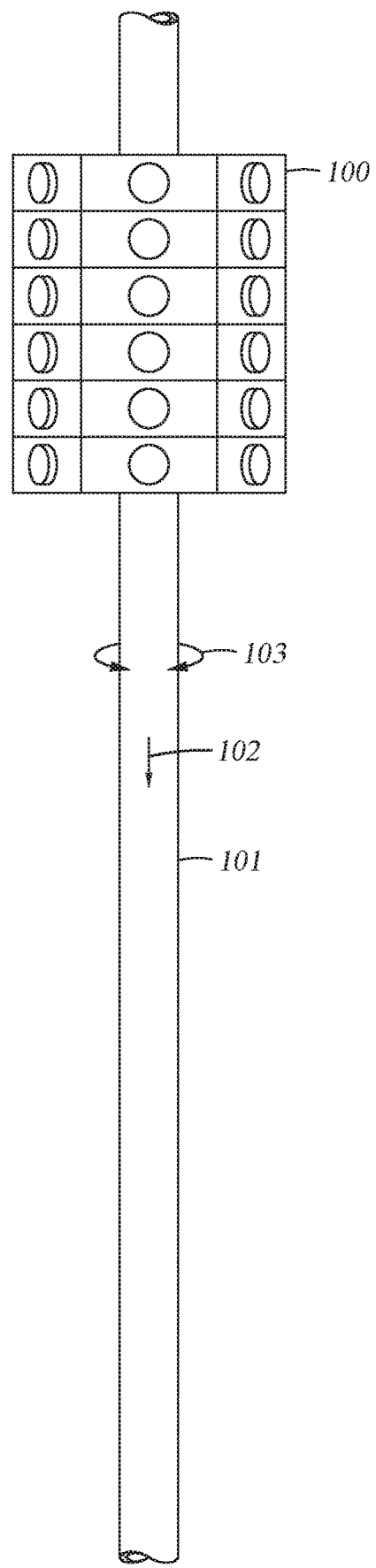
FIG. 1 illustrates a conventional single friction clamp having a pipe suspended therefrom.
Figure 2A:
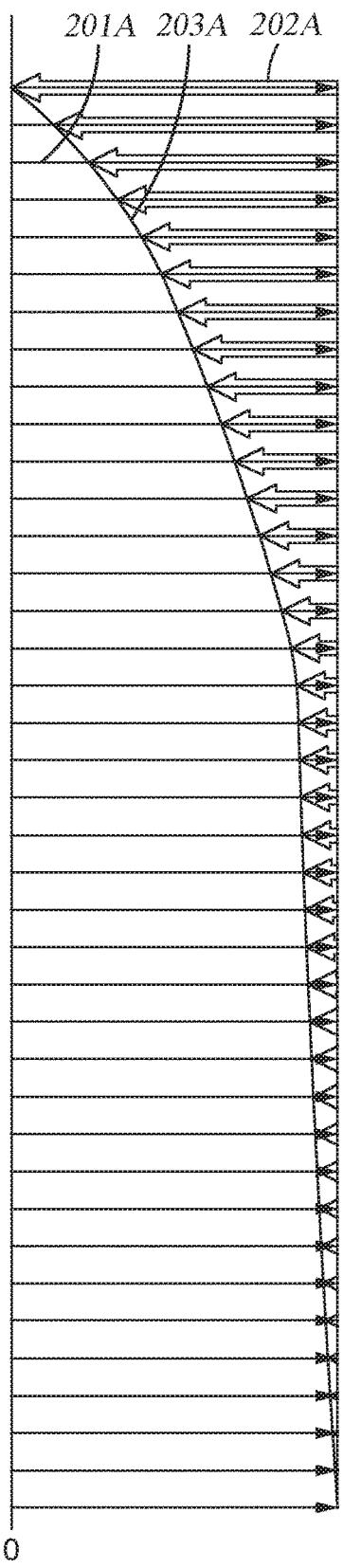
FIG. 2A illustrates axial and bending stress distribution along one side of an axial length of a section of a pipe below the conventional single friction clamp of FIG. 1.
Figure 2B:
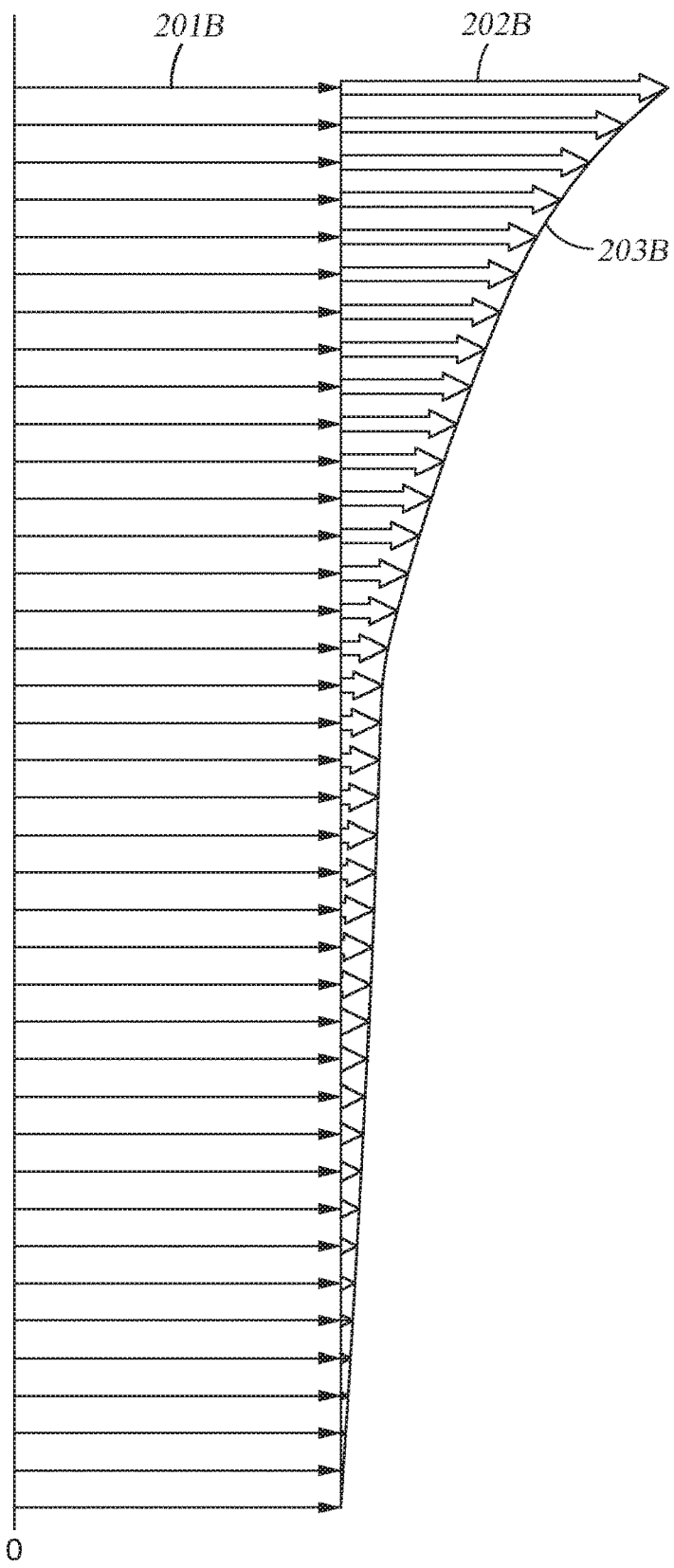
FIG. 2B illustrates axial and bending stress distribution along another side of the axial length of the section of the pipe below the conventional single friction clamp of FIG. 1.
Figure 3:
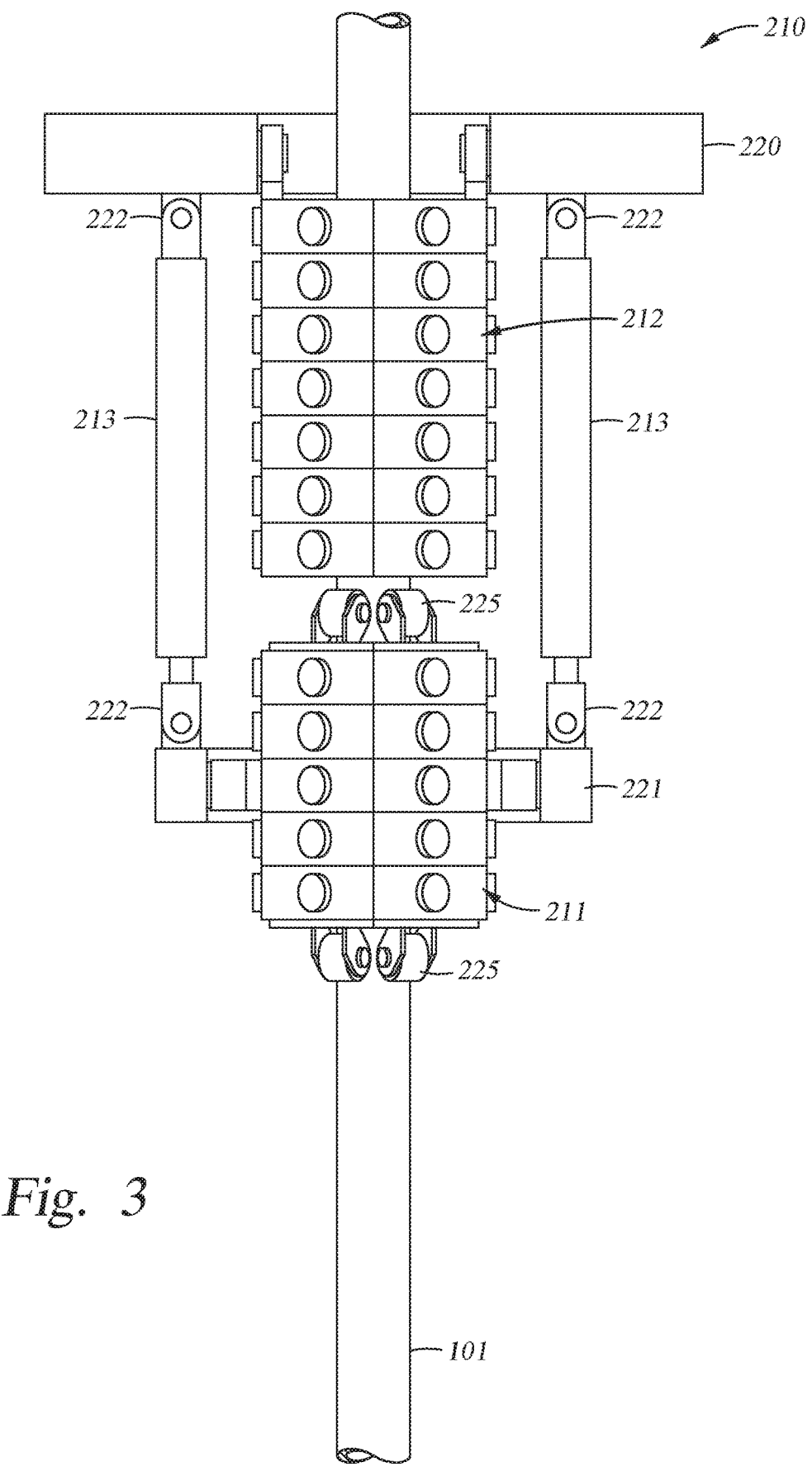
FIG. 3 illustrates a dual clamp arrangement in a retracted state, according to one aspect of the disclosure.

FIG. 3 illustrates a clamp system or dual clamp arrangement 210 in a retracted state, according to one aspect of the disclosure. The dual clamp arrangement 210 employs two clamps including a first clamp 211 and a second clamp 212. First clamp 211 is a lower clamp (or collar), holding some or all of the axial load of the pipe 101, with no moment resistance. First clamp 211 may be, for example, a swinging friction or collar clamp that restricts axial movement of the pipe 101 but allows the pipe 101 to swing. Second clamp 212 is an upper clamp which secures an upper end of the pipe 101 above the first clamp 211, and restrains bending moments to allow welding or other operations to be performed at the upper end of the pipe 101. The second clamp 212 may be a friction or collar clamp that is rigidly supported and restricts swinging of the pipe 101. Using dual clamps 211 and 212, high axial stress is removed some distance below the second clamp 212 (e.g., the moment restraining clamp), by the lower first clamp 211 located where the bending moment and bending stresses are low. The separation of functions for the clamps 211, 212 (e.g., moment restraint for second clamp 212 and axial restraint for first clamp 211) reduces fatigue and damage to the pipe 101. Thus, small (and less costly) vessels can be utilized to perform deep water pipe-lay.

The second clamp 212 is an upper clamp and the first clamp 211 is a lower clamp. The second clamp 212 and the first clamp 211 are operatively coupled through actuators 213. Each actuator of the actuators 213 includes a cylinder, such as a hydraulic cylinder or a pneumatic cylinder. The actuators 213 are coupled to a base 220 of the second clamp 212, and to a support 221 of the first clamp 211. To facilitate relative movement between the actuators 213 and the clamps 211, 212, the actuators 213 are coupled to the support 221 at a first end and the base 220 at a second end through moveable connections 222. The moveable connections 222 may be pivoting connections, as illustrated, or types of connections such as spherical bearings (for example ball bearings) or ball-in-socket joints to provide increased range of motion. In one example, the moveable connections 222 at the upper end of the actuators 213 pivot at 90 degrees relative to the moveable connections 222 at the lower end of the actuators 213. While aspects of the present disclosure are described with respect to hydraulic cylinders of the actuators 213, other actuating or extending connection members are also contemplated, and need not necessarily be cylindrically-shaped.

The first clamp 211 is movable relative to the second clamp 212 and/or the second clamp 212 is movable relative to the first clamp 211. The present disclosure contemplates that moving one of the first or second clamps 211, 212 relative to the other of the first or second clamps may include moving the other of the first or second clamps 211, 212. For example, the present disclosure contemplates that moving the second clamp 212 relative to the first clamp 211 may include actuating the actuators 213 to move the first clamp 211 while the second clamp 212 remains stationary.

Figure 4A:
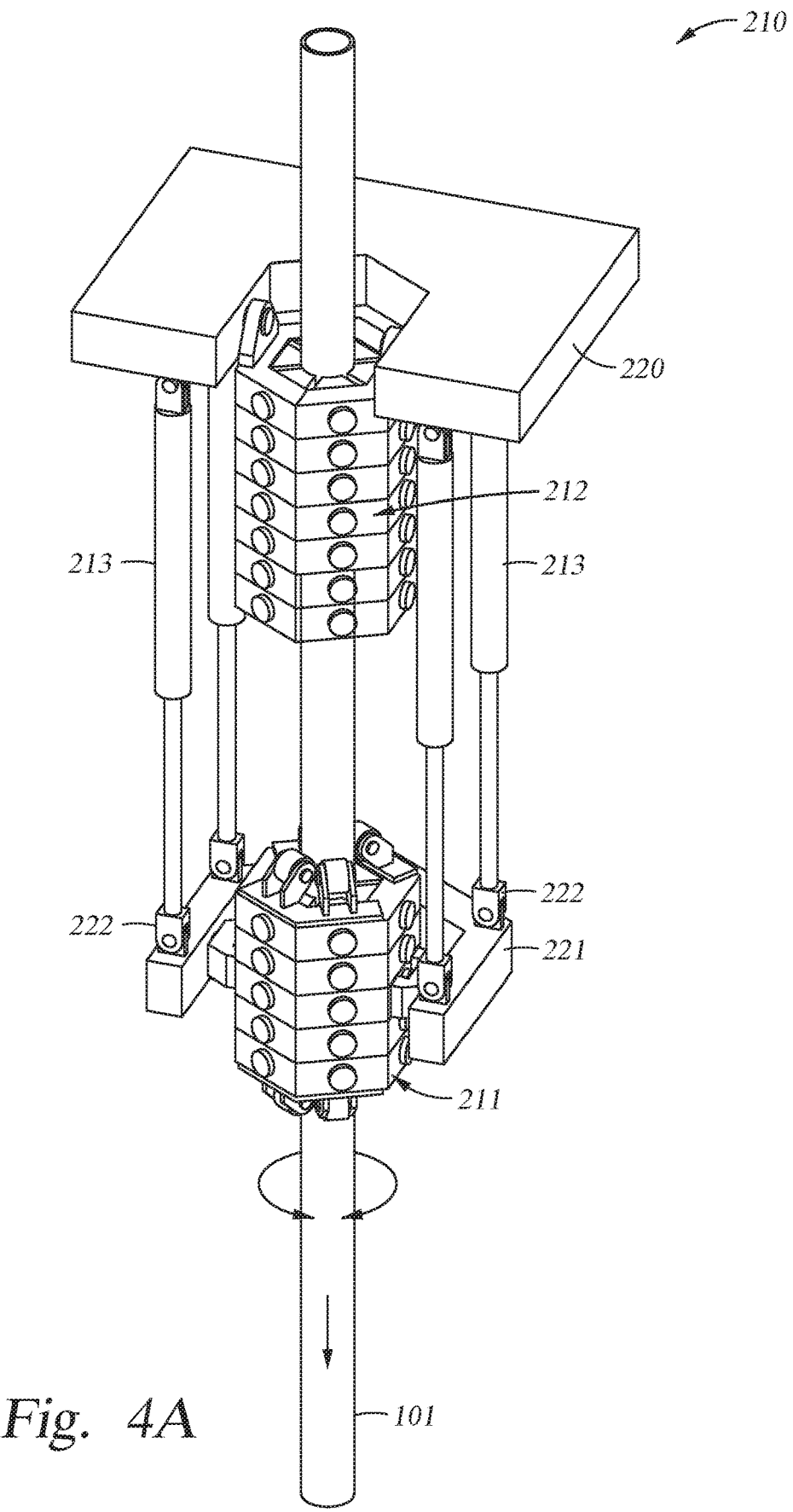
FIGS. 4A and 4B illustrate the dual clamp arrangement of FIG. 3 in an extended position, according to one aspect of the disclosure.
Figure 4B:
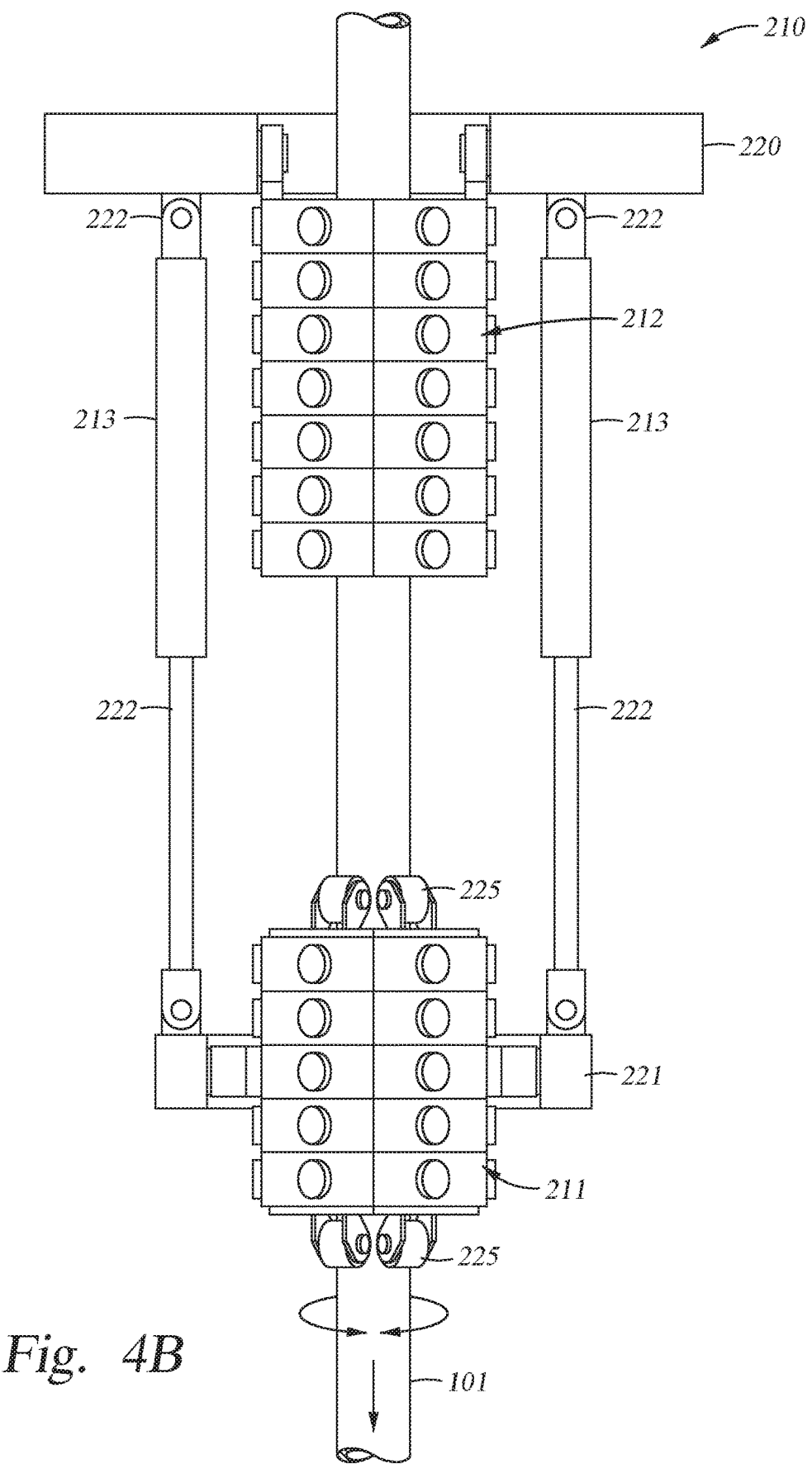

FIGS. 4A and 4B illustrate the dual clamp arrangement of FIG. 3 in an extended position, according to one aspect of the disclosure. The second clamp 212 and first clamp 211 are actuatable using the actuators 213 between the extended position illustrated in FIGS. 4A and 4B and the retracted position illustrated in FIG. 3. When laying larger diameter pipes, high bending moments may extend a significant distance below the second clamp 212. In such a case, the first clamp 211 can be lowered axially along the pipe 101 to a depth where the bending moments are within acceptable limits, and then secured on the pipe 101. In one example, a plurality of the actuators 213 (four are shown), having for example hydraulic or pneumatic cylinders, may facilitate actuation between the clamps 211 and 212. To facilitate movement of the first clamp 211 relative to the pipe 101, the first clamp 211 may include a plurality of rollers 225 at upper and/or lower ends thereof to engage the pipe 101. After clamping both the first clamp 211 and second clamp 212 to the pipe 101, the actuating cylinders 213 supporting the first clamp 211 are tensioned, taking part or all of the catenary top tension.

In the examples of FIGS. 4A and 4B, the first clamp 211 of the dual clamp arrangement 210 is fully extended and holding an axial load of the pipe 101 with no moment restraint, while the second clamp 212 restrains only bending moment. The first clamp 211 is suspended on the actuators 213, and annulus pressure can be set to support a specific load while pressure is held constant on hydraulic accumulators.

In one embodiment, which can be combined with other embodiments, it is contemplated that a proportion of pipe top tension that is supported by the first clamp 211 is adjustable from zero upward to a desired value. In doing so, it is contemplated that the pipe 101 between the clamps 211, 212 may be put into compression. By using such compression, the axial stress in the pipe 101 between the clamps 211, 212 is controllable. The axial stress between the clamps 211, 212 is controllable for example using the actuators 213, such as by altering the magnitude and/or direction of force applied between the base 201 and the support 221 by one or more of the actuators 213. In one example, one or more of the actuators 213 are at least partially retracted to axially apply compressive stress to the pipe 101 between the clamps 211, 212. In one example, an actuating force applied to actuate one or more of the actuators 213 is reduced to axially apply compressive stress to the pipe 101 between the clamps 211, 212. One or more of the actuators 213 may pull upwardly on the first clamp 211 to axially apply compressive stress to the pipe 101 between the clamps 211, 212. In one example, the compressive stress can be applied so that the compressive stress is greater than the bending stress caused by the moment, thus resulting in little to no tensile bending stresses in the pipe 101.

Thus, the disclosed dual clamp arrangement 210 facilitates reducing or completely eliminating fatigue damage of the pipe 101 at least in part by mitigating tensile bending stresses induced thereto. This is illustrated by the axial and bending stress distribution in the pipe 101 between the second clamp 212 and the first clamp 211, as shown in FIG. 5 below. However, the present disclosure is not so limited, as the lower first clamp 211 may not be tensioned with respect to the upper second clamp 212 such that the first clamp 211 does not induce compression into the pipe 101 between the clamps 211, 212. For example, after the lower clamp 211 has been moved to a desired position with respect to the second clamp 212, the actuators 213 or cylinders of the actuators 213 may be locked (e.g., hydraulically locked) such that the actuators 213 act similar to a fixed link. If used as a fixed link, the actuators 213 may prevent fluctuating axial stresses (e.g., from heave of the vessel) being translated through the first clamp 211 and to the pipe 101 between the clamps 211, 212.

The present disclosure contemplates that linkage may be used in place of the actuators 213. For example, a link having a spherical bearing at each end thereof may be used in place of each actuator 213 to facilitate cost reduction.

The present disclosure also contemplates that the actuators described throughout, such as actuators 213, may be fully extended and locked into place to function as rigid links.

Figure 5A:
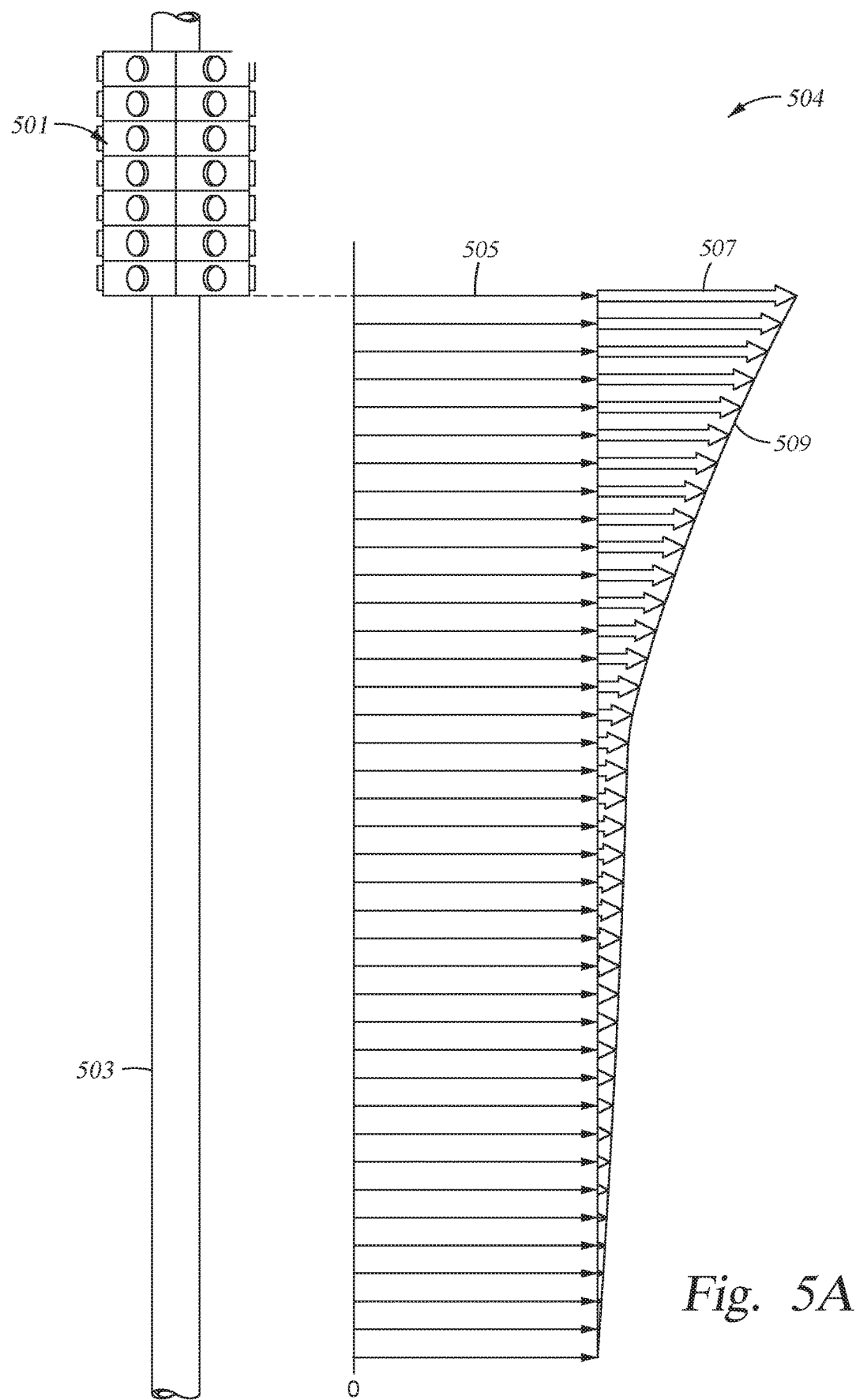
FIG. 5A illustrates a single clamp and a pipe, along with a chart of stress distribution of the pipe below the single clamp.
Figure 5B:
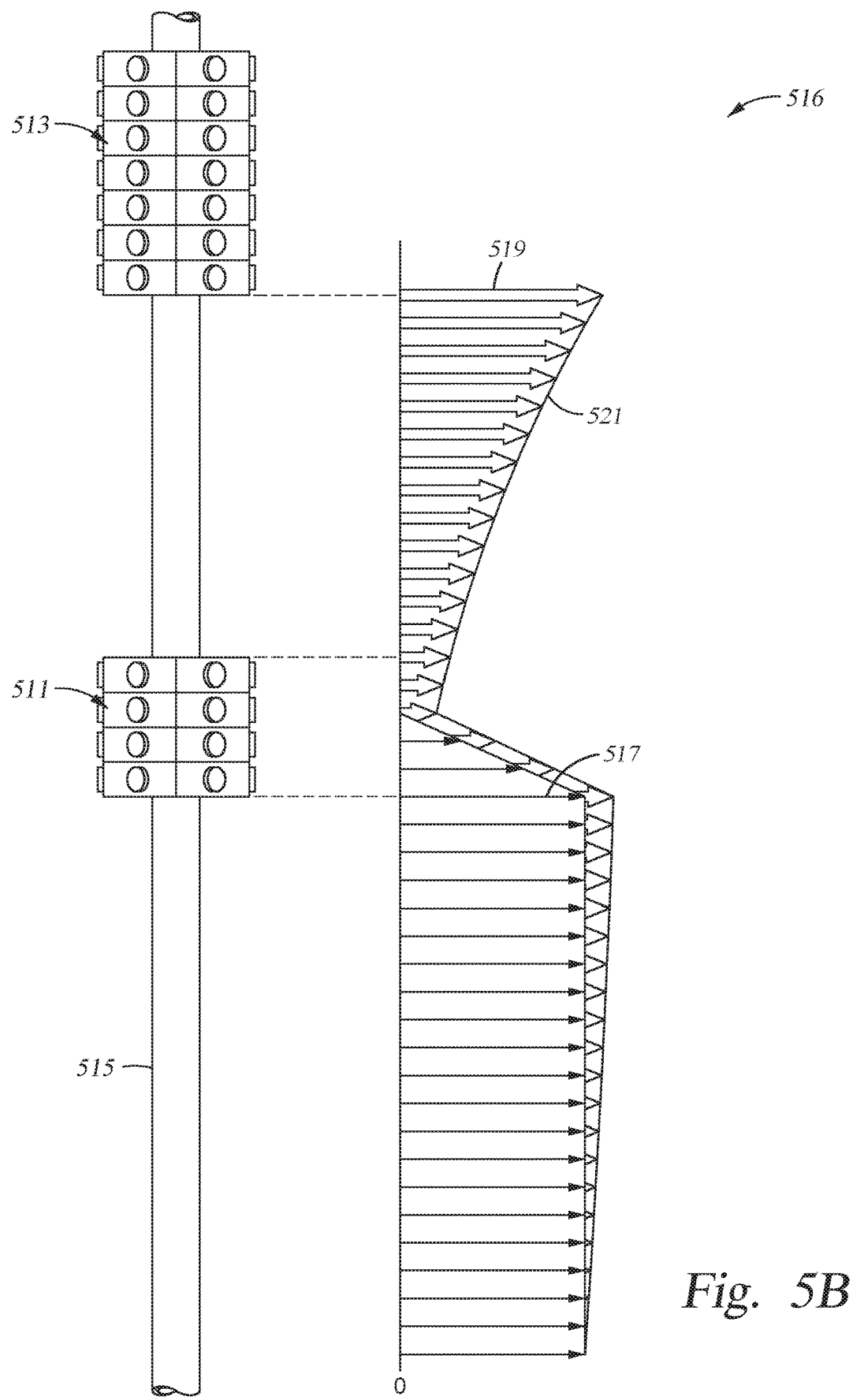
FIG. 5B illustrates a dual clamp arrangement without induced axial compression, according to one aspect of the disclosure.
Figure 5C:
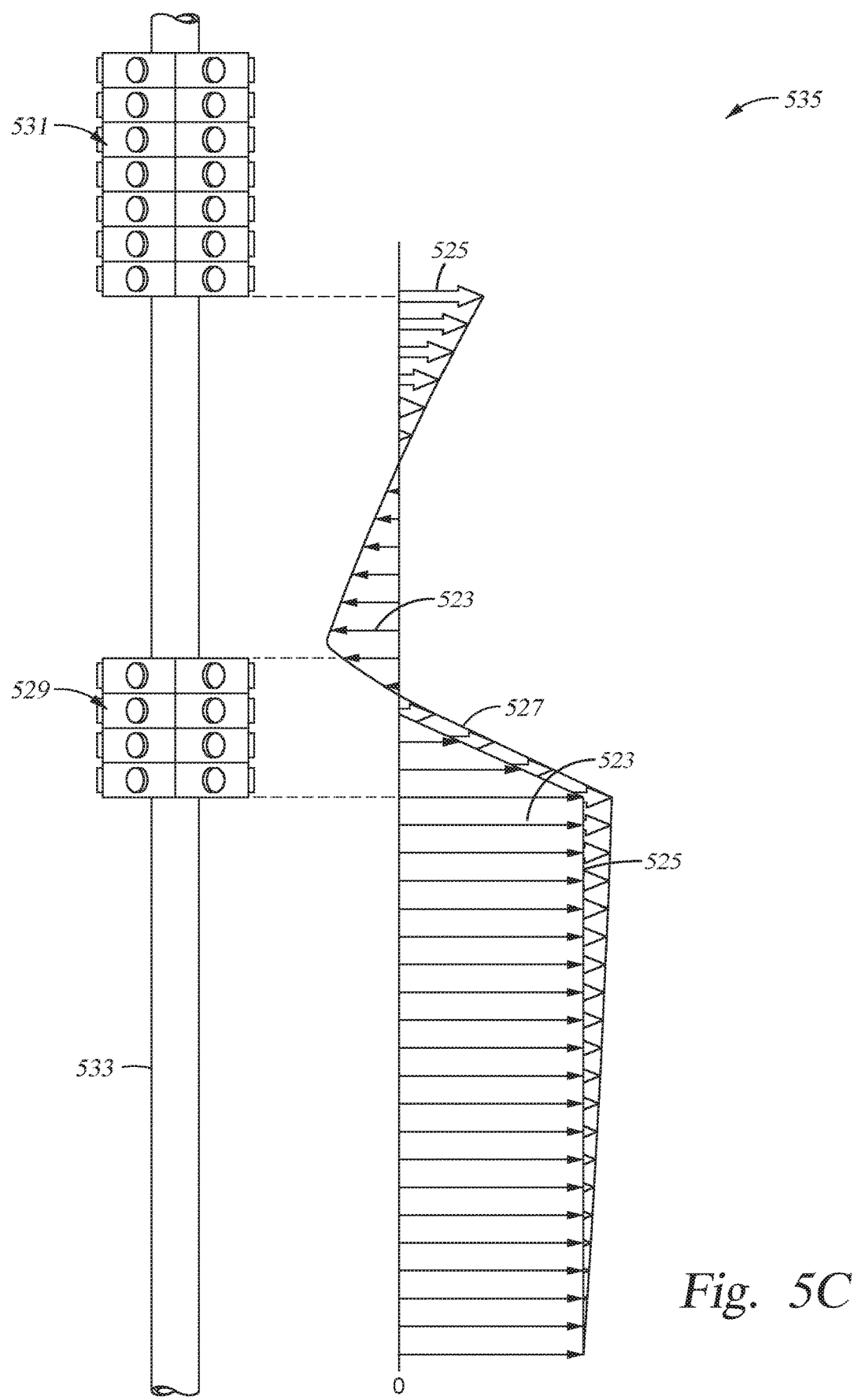
FIG. 5C illustrates a dual clamp arrangement with induced axial compression, according to one aspect of the disclosure.

FIGS. 5A-5C illustrate stress distribution according to different clamp configurations. FIG. 5A illustrates a single clamp 501 and a pipe 503, along with a chart 504 of stress distribution of the pipe 503 below the single clamp 501. In FIG. 5A, an axial stress 505 and a bending stress 507 combine as an overall stress 509. FIG. 5B illustrates a dual clamp arrangement without induced axial compression, according to one aspect of the disclosure. The dual clamp arrangement includes a first clamp 511, a second clamp 513 above the first clamp 511. The first clamp 511 and the second clamp 513 clamp to a pipe 515. FIG. 5B also illustrates a chart 516 of stress distribution of the pipe 515 below the second clamp 513. In FIG. 5B, an axial stress 517 and a bending stress 519 combine as an overall stress 521. In the dual clamp arrangement of FIG. 5B, the dual clamp arrangement is completely axially supported by the first clamp 511.

FIG. 5C illustrates a dual clamp arrangement with induced axial compression, according to one aspect of the disclosure. The dual clamp arrangement includes a first clamp 529 and a second clamp 531 above the first clamp 529. The first clamp 529 and the second clamp 531 clamp to a pipe 533. FIG. 5C also illustrates a chart 535 of stress distribution of the pipe 533 below the second clamp 531. In FIG. 5C, an axial stress 523 and a bending stress 525 combine as an overall stress 527. Compressive stress is applied axially to a section of the pipe 515 between the first clamp 529 and the second clamp 531. The first clamp 529 is used to apply compressive stress to the section of the pipe 515.

As illustrated in the dual clamp arrangement of FIG. 5C in which axial compression is induced between the clamps 529, 531, bending stress is greatly reduced. In the dual clamp arrangement of FIG. 5C, the overall stress 527 of the pipe 533 is reduced in the section between the first clamp 529 and the second clamp 531, as compared to the overall stress 521 at the same location in FIG. 5B and the overall stress 509 at the same location in FIG. 5A.

Figure 6:
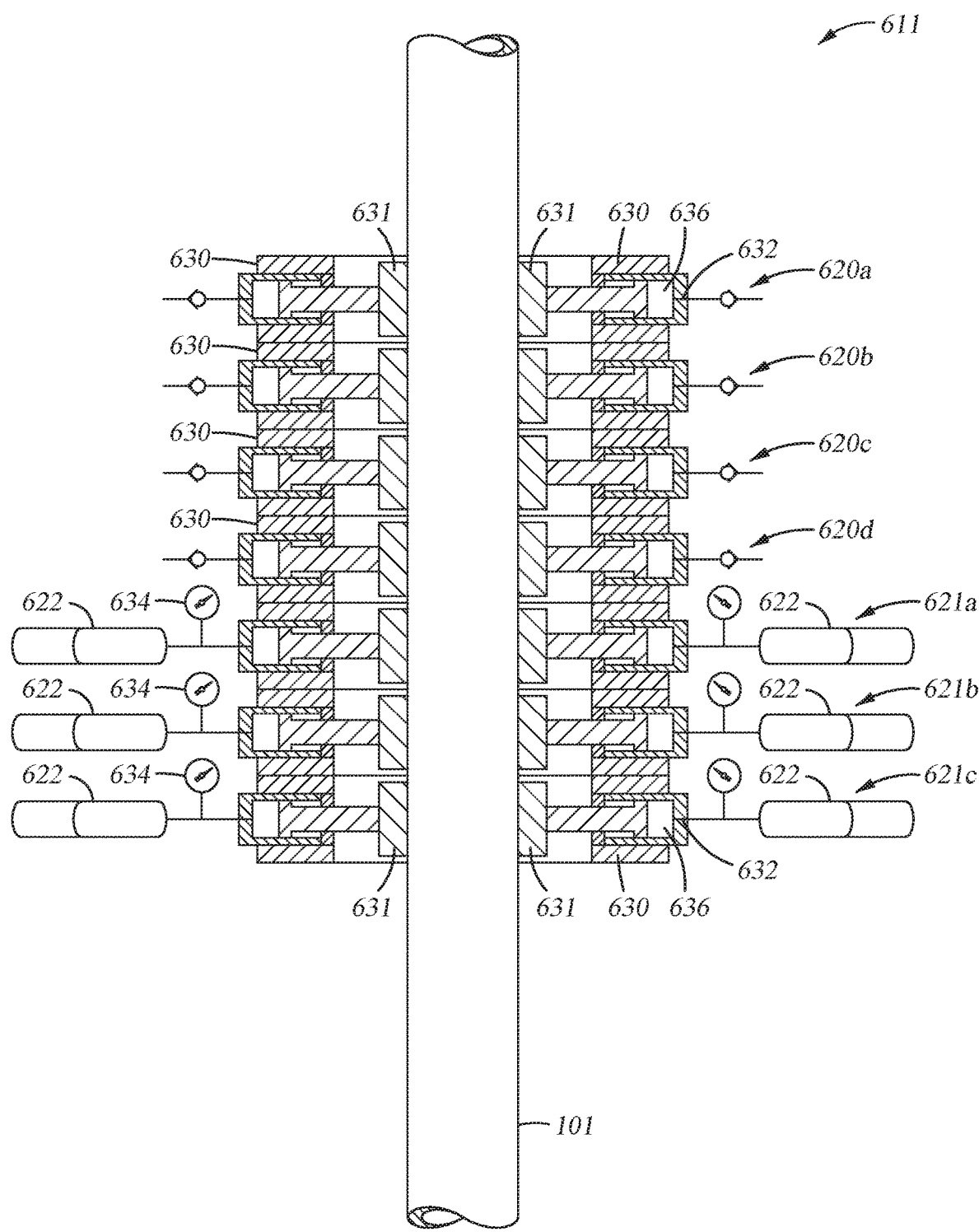
FIG. 6 illustrates a clamp, according to one aspect of the disclosure.

FIG. 6 illustrates a clamp 611, according to one aspect of the disclosure. The clamp 611 may be used as one or both of clamps 211 or 212.

Conventional friction grip clamps include of a number of layers, each supporting a portion of the top tension load. These layers restrain the pipe axial load and bending moment, providing a very stiff "encastre" support for the pipe. Although conventional friction grip clamps can support pipes, such support results in high pipe stresses as a combination of axial and bending stresses at the base of the clamp (together with high shear stresses), as discussed above.

In contrast, the clamp 611 utilizes one or more upper layers 620a-620d (four are shown) to provide axial and bending moment support, and one or more lowers layers 621a-621c (three are shown) as a variable stiffness spring. Variability in the spring stiffness of the lower layers 621a-621c is achieved by controlling a hydraulic pressure in variable "squeeze" cylinders (such as the cylinders 636 described below). The hydraulic pressure can be maintained at a constant value by accumulators 622 (six are shown). Such a support regime leads to more compliant lower layers 621a-621c of the clamp 611, and thus "softens" the support to the pipe 101 at the base of the clamp 611. This in turn reduces the bending stresses induced in the pipe 101. Each of the accumulators 622 may include a gas side separated from a hydraulic liquid side to facilitate maintaining a certain pressure. The accumulators 622 may function as gas springs.

The clamp 611 is shown with four upper layers 620a-620d and three lower layers 621a-6212c, however, it is contemplated that the clamp 611 can be extended or retracted with sufficient numbers of upper and/or lower layers to provide the desired support stiffness.

Each layer 620 of the clamp 611 includes a housing 630, one or more actuating clamp members 631 disposed in the housing 630, and an inlet 632 at a radially outward end of the housing 630 for receiving a signal or fluid for actuating the actuating clamp member 631 into engagement with the pipe 101. In one example, fluid enters a cylinder 636 for each actuating clamp member 631 through the inlet 632. Each layer 621a-621c is similarly constructed, but additionally includes a respective accumulator 622 per actuating clamp member 631, and a corresponding pressure gauge 634 per accumulator 622 (one is labeled).

In one example, each housing 630 is a cylindrical member configured to house a plurality of actuating clamp members 631 radially therearound. In one example, each housing 630 is a discrete member, configured to house an individual actuating clamp member 631. The actuating clamp members may be disposed at a predetermined angular distance from one another around the pipe 101, such as 180 degrees, 120 degrees, or 90 degrees.

The present disclosure contemplates that the clamp 611 may be used in a single clamp configuration rather than a dual clamp configuration. In such examples, due to the variability in the spring stiffness of the lower layers 621a-621c, the clamp 611 provides adequate mitigation of bending stresses without the need for a second clamp.

FIGS. 7A-7E illustrate a clamp system 710, according to one aspect of the disclosure. The clamp system 710 includes a lower clamp 711 and an upper clamp 712 for supporting the pipe 101. As with the above embodiments, the lower clamp 711 may be a swinging friction or collar clamp that restricts axial movement of the pipe 101 but allows the pipe 101 to swing. Further, the upper clamp 712 secures to the pipe 101 above the lower clamp 711 and restrains bending moments to allow welding or other operations to be performed at the upper end of the pipe 101. The upper clamp 712 may be a friction or collar clamp that is rigidly supported and restricts swinging of the pipe 101.

The clamp system 710 as shown includes a hull 730 and an overhead structure 732, such as a tower, coupled to and supported by the hull 730. The overhead structure 732 is shown as rotatably coupled to the hull 730 through pins 734. The lower clamp 711 and the upper clamp 712 are supported by and coupled to the overhead structure 732, such as by each being separately supported and coupled to the overhead structure 732.

The upper clamp 712 is translatably coupled to the overhead structure 732, such as through actuators or sheaves 736. As shown, the sheaves 736 are coupled to the upper clamp 712, and winches or pulleys may use lines or tensioners with the sheaves 736 to translate and move the upper clamp 712 with respect to the overhead structure 732. The lines or tensioners may be attached to the sheaves 736 at a first end and the overhead structure 732 at a second end. The lower clamp 711 is rotatably coupled to the overhead structure 732, such as through moveable connections or spherical bearings 738 (e.g., ball bearings). Links 740 are used to couple the lower clamp 711 to the overhead structure 732, and spherical bearings 738 may be used at one or both ends of the links 740 to rotatably couple the lower clamp 711 to the overhead structure 732.

As with the aspects illustrated in FIGS. 3, 4A, and 4B, the lower clamp 711 and the upper clamp 712 are movable with respect to each other, such as when each of the clamps 711, 712 are supporting the pipe 101, or when only one of the clamps 711, 712 is supporting the pipe 101. For example, the clamps 711, 712 are movable along a longitudinal axis 190 of the pipe 101 with respect to each other, such as to adjust a distance 750 between the upper clamp 712 and the lower clamp 711. In the aspects illustrated in FIGS. 7A-7E, the upper clamp 712 and the lower clamp 711 are movable along the longitudinal axis 190 of the pipe 101 with respect to each other by moving the upper clamp 712 relative to the overhead structure 732, such as through the sheaves 736.

Figure 7A:
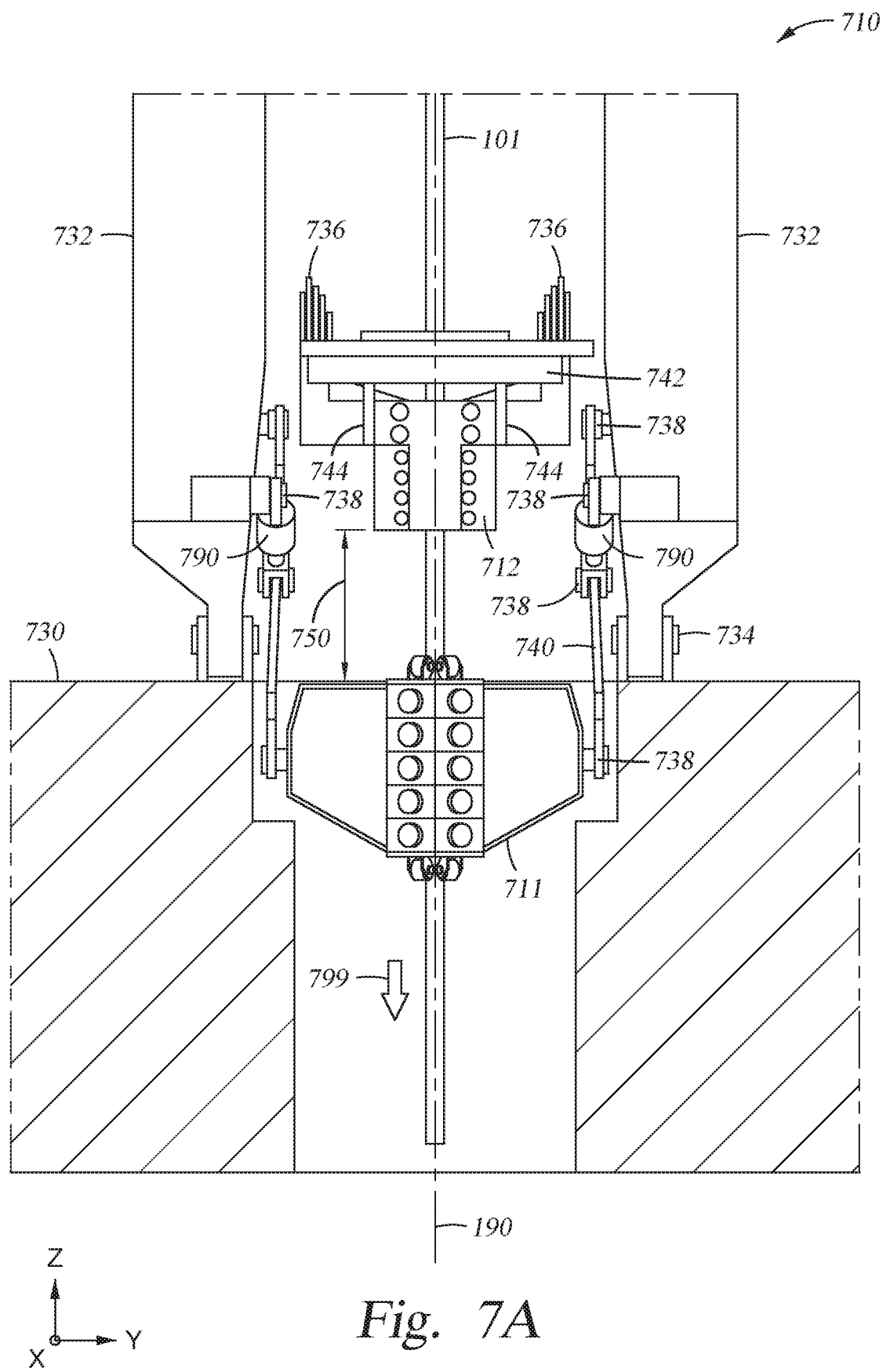
FIGS. 7A-7E illustrate a clamp system, according to one aspect of the disclosure.
Figure 7B:
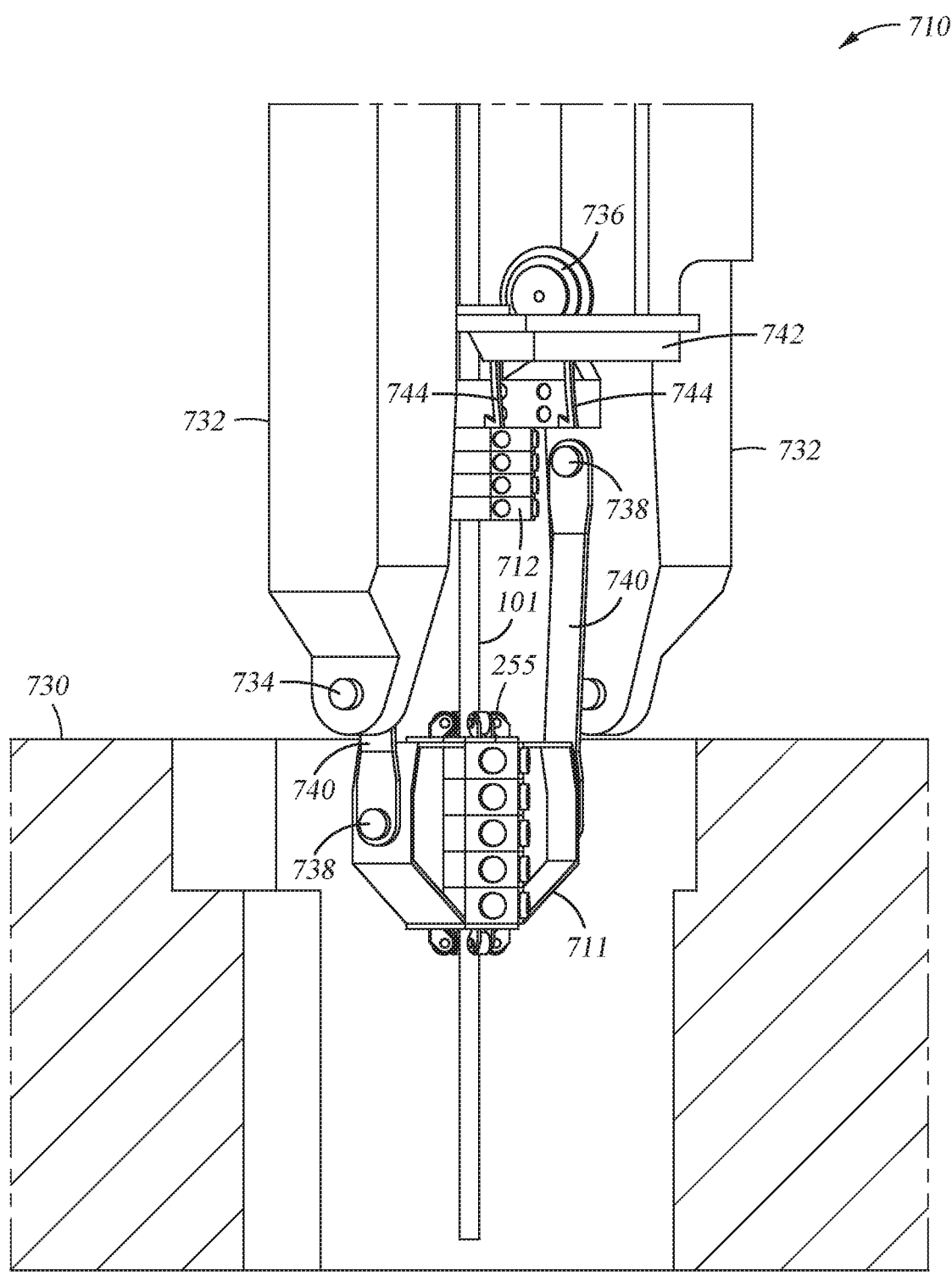
Figure 7C:
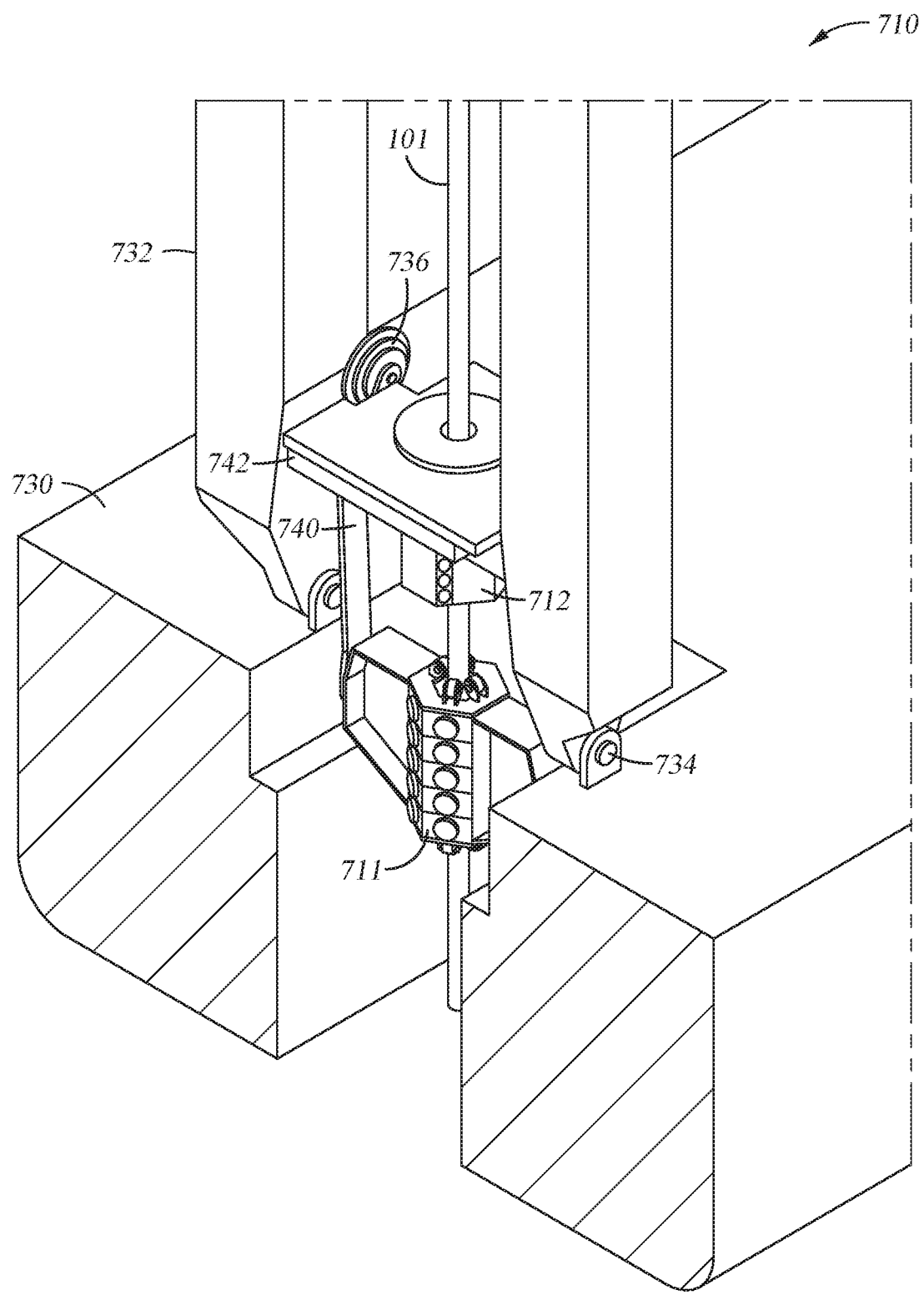
Figure 7D:
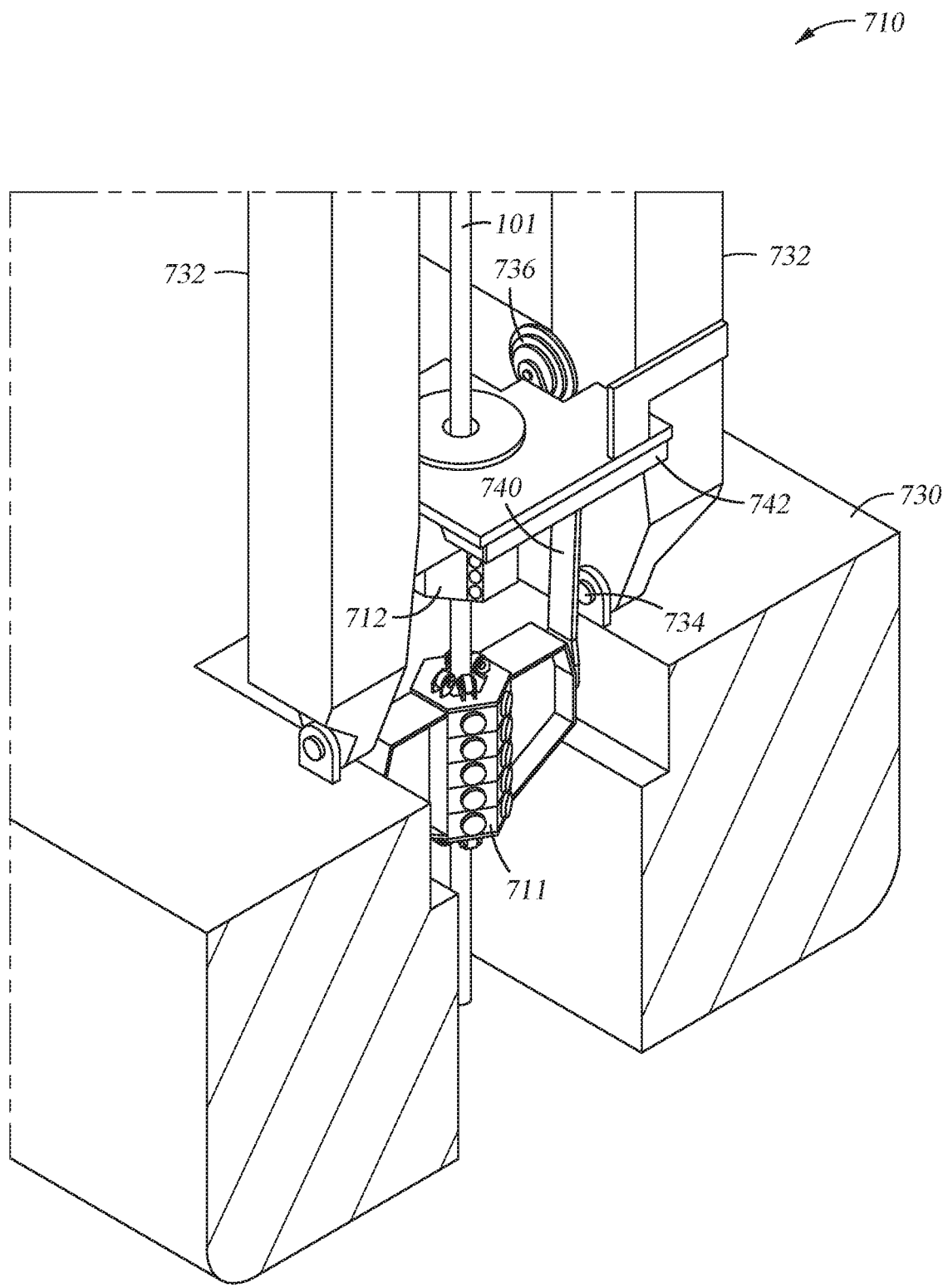
Figure 7E:
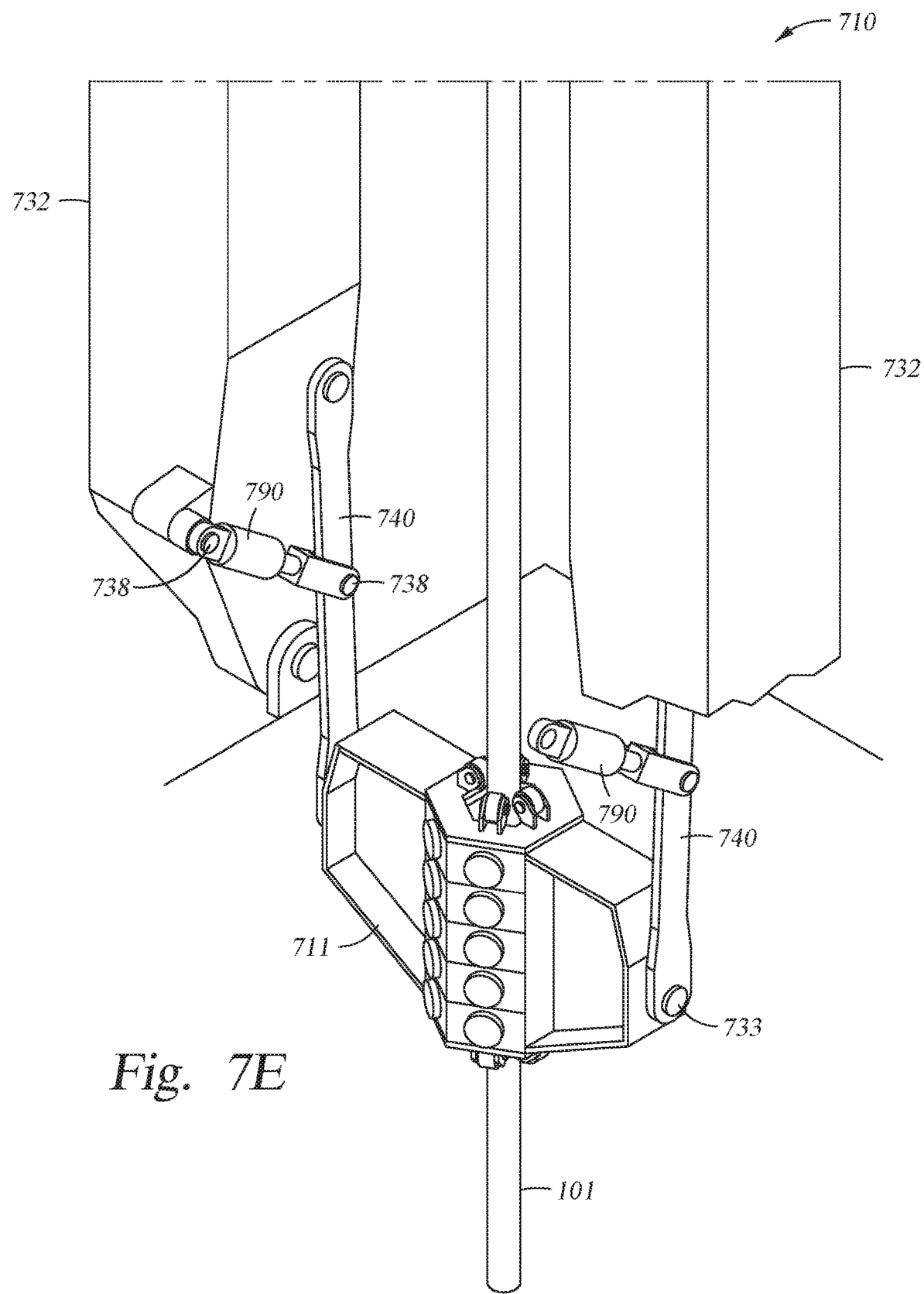

The upper clamp 712 and the lower clamp 711 are also movable along the longitudinal axis 190 of the pipe 101 with respect to each other by actuating one or more actuators of each link 740 to move the lower clamp 711 relative to the overhead structure 732. Each of one or more actuators includes a hydraulic cylinder and/or a pneumatic cylinder, and is connected to an accumulator that supplies pressurized fluid to the hydraulic or pneumatic cylinder. In one example the one or more actuators are used as the links 740, and are coupled at a first end to the lower clamp 711 through the spherical bearings 738 and at a second end to the overhead structure 732. In one example the one or more actuators are actuators 790 that are disposed between each link 740 and the overhead structure 732, as illustrated in FIGS. 7A, 7C, and 7D. Each of the actuators 790 is coupled to one of the links 740 through a spherical bearing 738 at a first end and to the overhead structure 732 through a spherical bearing 738 at a second end.

The one or more actuators of the links 740 facilitate positioning of the lower clamp 711 while heave of the vessel changes. In one example, pipe 101 is layed at an angle relative to the hull 730 and/or a gravitational force 799. In such an example, the overhead structure 732 is disposed at an angle relative to the hull 730 and/or the gravitational force 799 by rotating the overhead structure 732 about the pins 734. In such an example, the actuators of the links 740 can facilitate maintaining the clamp 711 (such as a housing of the clamp 711) at a gap from the pipe 101 during heave changes of the vessel, while welding or other operations are performed at the upper end of the pipe 101. In one embodiment, which can be combined with other embodiments, the actuators 790 are disposed in a horizontal fashion when the overhead structure 732 is disposed vertically and is parallel to the gravitational force 799.

In one embodiment, which can be combined with other embodiments, the longitudinal axis 190 extends along a geometric center of the pipe 101.

Further, the lower and upper clamps 711, 712 are rotatable with respect to each other in one or more planes that are parallel to the longitudinal axis 190 of the pipe 101. For example, the upper clamp 712 and the lower clamp 711 are able to rotate with respect to each other in two planes simultaneously that are parallel to the longitudinal axis of the pipe 101. The lower clamp 711 is able to swing in one or more directions with respect to the upper clamp 712 through the links 740 and the spherical bearings 738. Furthermore, each of the clamps 711, 712 may be used for separate functions (e.g., moment restraint for upper clamp 712 and axial restraint for lower clamp 711) to reduce fatigue and damage to the pipe 101.

FIG. 7A illustrates an X-axis, a Y-axis, and a Z-axis of the overhead structure 732 that define an X-Y plane, an X-Z plane, and a Y-Z plane. The lower and upper clamps 711, 712 are rotatable with respect to each other in two planes (e.g., the X-Z plane and the Y-Z plane) that are parallel to the longitudinal axis 190. The lower and upper clamps 711, 712 are also rotatable with respect to each other in a plane (e.g., the X-Y plane) that is perpendicular to the longitudinal axis 190.

In one or more embodiments, one or more different components or structures may be used to substitute for, or used in addition to, the functionality of the links 740 and the spherical bearings 738. For example, a gimbal or other support structure may be coupled between the lower clamp 711 and the hull 730 or the overhead structure 732 to enable the upper clamp 712 and the lower clamp 711 to rotate with respect to each other in two planes simultaneously that are parallel to the longitudinal axis 190 of the pipe 101. The gimbal or support structure may include one or more elastomeric or biasing supports positioned between plates, or layered with plates, with the lower clamp 711 supported by the gimbal or support structure. Thus, the lower clamp 711 may be able to rotate with respect to the upper clamp 712 through the gimbal or support structure.

Referring still to FIGS. 7A-7E, the clamp system 710 includes a platform 742 that enables access to the pipe 101. The upper clamp 712 is positioned below and coupled to the platform 742. The upper clamp 712 and/or the lower clamp 711 are also movable with respect to the platform 742. The lower clamp 711 is movable with respect to the platform 742 along the longitudinal axis 190 of the pipe 101, such as through the sheaves 736. Further, the upper clamp 712 is movable with respect to the platform 742 by being rotatable in one or more planes parallel to the longitudinal axis 190 of the pipe 101. For example, actuators 744 are coupled between the platform 742 and the upper clamp 712 to actuate and enable movement, as desired, between the platform 742 and the upper clamp 712. Each of the actuators 744 may include hydraulic cylinders and/or pneumatic cylinders. In an event that the vessel, and therefore the hull 730 and the overhead structure 732 are not level, the platform 742 may be rotated with respect to the upper clamp 712 to provide a more level environment for workers on the platform 742 that are accessing the pipe 101.

The pipe 101 of the clamp system 710 illustrated in FIGS. 7A-7E may undergo fluctuations in axial stress and bending stress due to heave of the vessel and roll of the vessel, respectively. For example, the pipe 101 may undergo sinusoidal fluctuations in axial stress, particularly below the lower clamp 711, due to heave of the vessel. The lower clamp 711 and the upper clamp 712 facilitate reducing or eliminating the axial stress and the bending stress in the pipe 101. As the lower clamp 711 may be used to reduce or remove the axial stress load of the pipe 101, the axial stress may not be imparted to the pipe 101 supported above the lower clamp 711.

Hence, sections of the pipe 101 above the lower clamp 711 experience reduced or eliminated axial stress due to the lower clamp 711. This may particularly occur in implementations in which the clamp system 710 does not induce axial compression into a section of the pipe 101 between the clamps 711, 712. The upper clamp 712, as shown, may then be used to support the pipe 101 to remove or limit the bending stress imparted into the pipe 101 above the upper clamp 712. The section of the pipe 101 between the clamps 711, 712 may experience no axial stress and only bending stress. Limiting the axial stress of the pipe 101 mitigates fatigue of the pipe 101 and promotes increase lifespan of the pipe 101.

Limiting the axial stress and/or bending stress of the pipe 101 also facilitates a wider operating envelope for the vessel having the clamp system 710. For example, the vessel having the clamp system 710 may be used to lay pipeline in a wider range of conditions, such as in harsher weather conditions.

While the foregoing is directed to embodiments of the present disclosure, other and further embodiments of the disclosure may be devised without departing from the basic scope thereof, and the scope thereof is determined by the claims that follow.

What is claimed is:

1. A clamp system for supporting a pipe on a vessel, comprising:
    a first clamp for coupling to the pipe; and
    a second clamp for coupling to the pipe, the second clamp disposed above the first clamp, wherein at least one of the first clamp or the second clamp is movable along a longitudinal axis of the pipe to adjust a distance between the first clamp and the second clamp, and at least one of the first clamp or the second clamp is rotatable relative to the other of the first clamp or the second clamp in at least one plane parallel to the axis;
    an overhead structure with the second clamp translatably coupled to the overhead structure and the first clamp rotatably coupled to the overhead structure, wherein:
        the second clamp is translatably coupled to the overhead structure through a plurality of actuators; and
        the first clamp is rotatably coupled to the overhead structure through a plurality of links and a plurality of spherical bearings; and
    a platform with the second clamp coupled to the platform below the platform, the first clamp movable with respect to the platform along the longitudinal axis of the pipe.

2. The clamp system of claim 1, wherein each one of the first clamp and the second clamp is rotatable relative to the other of the first clamp and the second clamp in two planes parallel to the axis simultaneously.

3. The clamp system of claim 1, further comprising one or more actuators, each of the one or more actuators being coupled to the first clamp at a first end and coupled to the second clamp at a second end.

4. The clamp system of claim 3, wherein at least one of the first clamp or the second clamp is movable relative to the other of the first clamp or the second clamp by actuating the one or more actuators.

5. The clamp system of claim 1, wherein the second clamp is rotatable with respect to the platform in at least one plane parallel to the longitudinal axis of the pipe.

6. A clamp system for supporting a pipe on a vessel comprising:
    a first clamp for coupling to the pipe; and
    a second clamp for coupling to the pipe, the second clamp disposed above the first clamp, wherein at least one of the first clamp or the second clamp is movable along a longitudinal axis of the pipe to adjust a distance between the first clamp and the second clamp, and at least one of the first clamp or the second clamp is rotatable relative to the other of the first clamp or the second clamp in at least one plane parallel to the axis;
    an overhead structure with the second clamp translatably coupled to the overhead structure and the first clamp rotatably coupled to the overhead structure, wherein:
        the second clamp is translatably coupled to the overhead structure through a plurality of actuators; and
        the first clamp is rotatably coupled to the overhead structure through a plurality of links and a plurality of spherical bearings; and
    one or more actuators coupled to the plurality of links, each of the one or more actuators being coupled to one of the plurality of links at a first end and the overhead structure at a second end.

7. The clamp system of claim 6, wherein each of the one or more actuators comprises a hydraulic cylinder.

8. A method of supporting a pipe on a vessel, comprising:
    coupling a first clamp to a pipe, the pipe comprising a longitudinal axis;
    coupling a second clamp to the pipe, the second clamp disposed above the first clamp wherein at least one of the first clamp or the second clamp is movable along a longitudinal axis of the pipe to adjust a distance between the first clamp and the second clamp, and at least one of the first clamp or the second clamp is rotatable relative to the other of the first clamp or the second clamp in at least one plane parallel to the axis;
    coupling an overhead structure to the second clamp and the first clamp, the second clamp translatably coupled to the overhead structure and the first clamp rotatably coupled to the overhead structure, wherein:
        the second clamp is translatably coupled to the overhead structure through a plurality of actuators; and
        the first clamp is rotatably coupled to the overhead structure through a plurality of links and a plurality of spherical bearings; and
    coupling a platform to the second clamp below the platform, the first clamp movable with respect to the platform along the longitudinal axis of the pipe.

9. The method of claim 8, further comprising:
    applying compressive stress to a section of the pipe between the first clamp and the second clamp.

10. The method of claim 8, wherein the moving at least one of the first clamp or the second clamp comprises: actuating one or more actuators coupled to the first clamp to move the first clamp relative to an overhead structure of the vessel.

11. The method of claim 8, wherein the moving at least one of the first clamp or the second clamp comprises: using a line and a sheave attached to the second clamp to move the second clamp relative to an overhead structure of the vessel.

12. A clamp system, comprising:
- a first clamp and a second clamp, the first clamp and the second clamp both comprising:
  - a plurality of clamping layers comprising one or more lower layers and one or more upper layers disposed above the one or more lower layers, each of the one or more lower layers comprising:
  - one or more variable squeeze cylinders, and
  - one or more actuating clamp members, and wherein a pressure within each of the one or more variable squeeze cylinders is maintained at a constant value when the one or more actuating clamp members are in contact with a pipe; and
- a platform with the second clamp coupled to the platform below the platform, the first clamp is movable with respect to the platform along a longitudinal axis of the pipe.

13. The clamp of claim 12, wherein each of the one or more lower layers comprises one or more accumulators.

14. The clamp of claim 13, wherein each of the one or more upper layers comprises one or more actuating clamp members to contact the pipe.

* * * * *